US012308056B2

(12) United States Patent
Ho et al.

(10) Patent No.: US 12,308,056 B2
(45) Date of Patent: May 20, 2025

(54) MAGNETIC RECORDING MEDIUM WITH MAGNESIUM-TITANIUM OXIDE (MTO) LAYER FORMED USING PULSED DIRECT CURRENT SPUTTER DEPOSITION

(71) Applicant: Western Digital Technologies, Inc., San Jose, CA (US)

(72) Inventors: Hoan Cong Ho, San Jose, CA (US); Paul Christopher Dorsey, Los Altos, CA (US); Tomoko Seki, Sunnyvale, CA (US); Pierre-Olivier Jubert, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/379,410

(22) Filed: Oct. 12, 2023

(65) Prior Publication Data

US 2025/0124951 A1   Apr. 17, 2025

(51) Int. Cl.
    *G11B 5/66*   (2006.01)
    *G11B 5/73*   (2006.01)
    (Continued)

(52) U.S. Cl.
    CPC ............ *G11B 5/66* (2013.01); *G11B 5/7369* (2019.05); *G11B 5/851* (2013.01); *G11B 2005/0021* (2013.01)

(58) Field of Classification Search
    CPC ......... G11B 5/66; G11B 5/7369; G11B 5/851; G11B 2005/0021
    See application file for complete search history.

(56) References Cited

U.S. PATENT DOCUMENTS 6,537,684 B1   3/2003   Doerner et al.
6,579,590 B2   6/2003   Ju et al.
(Continued)

FOREIGN PATENT DOCUMENTS

CN   104364846 A   2/2015
JP      5925907 B2   5/2016
(Continued)

OTHER PUBLICATIONS

English Machine translation of JP2013-149316, Aug. 1, 2013 (Year: 2013).*

(Continued)

*Primary Examiner* — Holly Rickman
(74) *Attorney, Agent, or Firm* — LOZA & LOZA, LLP; Gabriel Fitch

(57) ABSTRACT

Various apparatuses, systems, methods, and media are disclosed to provide a heat-assisted magnetic recording (HAMR) medium that has a magnetic recording layer on a MgO—TiO (MTO) underlayer, where the MTO underlayer is formed using pulsed DC sputtering and has less than 50 mol % of TiO. By providing an MTO layer with less than 50 mol % of TiO, smaller grain sizes may be achieved in the magnetic recording layer, providing for higher areal densities. In some embodiments, a second MTO underlayer is provided, which is formed using non-pulsed DC sputtering and has 50 mol % of TiO. That is, a dual-layer MTO underlayer may be provided with, e.g., an MgO-30TiO layer atop an MgO-50TiO layer.

22 Claims, 9 Drawing Sheets

(51) Int. Cl.
   *G11B 5/851* (2006.01)
   *G11B 5/00* (2006.01)

(56) References Cited

U.S. PATENT DOCUMENTS

| | | | |
|---|---|---|---|
| 7,869,162 | B2 | 1/2011 | Lu et al. |
| 8,279,739 | B2 | 10/2012 | Kanbe et al. |
| 8,941,950 | B2 | 1/2015 | Yuan et al. |
| 8,993,134 | B2 | 3/2015 | Varaprasad et al. |
| 9,076,476 | B2 | 7/2015 | Kryder et al. |
| 9,177,585 | B1 | 11/2015 | Seki et al. |
| 9,368,142 | B2 | 6/2016 | Chen et al. |
| 9,530,445 | B1 | 12/2016 | Grobis et al. |
| 9,672,854 | B2 | 6/2017 | Kubota et al. |
| 9,754,618 | B1 | 9/2017 | Srinivasan et al. |
| 9,779,771 | B1 * | 10/2017 | Wang ............... G11B 5/72 |
| 9,822,441 | B2 | 11/2017 | Liu et al. |
| 10,127,939 | B2 | 11/2018 | Niwa et al. |
| 10,255,939 | B2 | 4/2019 | Hu et al. |
| 10,276,201 | B1 | 4/2019 | Srinivasan et al. |
| 10,347,281 | B2 | 7/2019 | Arora et al. |
| 10,439,133 | B2 | 10/2019 | Apalkov et al. |
| 10,453,487 | B2 | 10/2019 | Kubota et al. |
| 10,650,854 | B1 | 5/2020 | Yuan et al. |
| 10,923,150 | B2 | 2/2021 | Moriya et al. |
| 11,437,064 | B1 | 9/2022 | Jubert et al. |
| 11,521,648 | B2 | 12/2022 | Ho et al. |
| 11,521,658 | B2 | 12/2022 | Choi et al. |
| 11,900,978 | B1 * | 2/2024 | Ho ............... G11B 5/7375 |
| 2007/0148500 | A1 | 6/2007 | Maeda et al. |
| 2010/0255348 | A1 | 10/2010 | Sato et al. |
| 2013/0314815 | A1 | 11/2013 | Yuan et al. |
| 2014/0072828 | A1 | 3/2014 | Inaba et al. |
| 2014/0099517 | A1 | 4/2014 | Hu et al. |
| 2014/0127533 | A1 | 5/2014 | Xiao et al. |
| 2014/0335376 | A1 | 11/2014 | Valaprasad et al. |
| 2014/0376127 | A1 | 12/2014 | Kanbe et al. |
| 2015/0093598 | A1 | 4/2015 | Kubota et al. |
| 2016/0099016 | A1 | 4/2016 | Kubota et al. |
| 2016/0099017 | A1 | 4/2016 | Hellwig et al. |
| 2016/0358622 | A1 | 12/2016 | Arora et al. |
| 2017/0125050 | A1 | 5/2017 | Kataoka et al. |
| 2018/0040346 | A1 | 2/2018 | Moriya et al. |
| 2018/0218752 | A1 | 8/2018 | Lu et al. |
| 2018/0286441 | A1 | 10/2018 | Lu |
| 2023/0005503 | A1 | 1/2023 | Iwanami et al. |
| 2024/0071416 | A1 * | 2/2024 | Ho ............... G11B 5/7369 |
| 2024/0096368 | A1 | 3/2024 | Yuan et al. |

FOREIGN PATENT DOCUMENTS

| | | | |
|---|---|---|---|
| JP | 6185591 | B2 | 8/2017 |
| JP | 2020164959 | A | 10/2020 |

OTHER PUBLICATIONS

Sepehri-Amin, H. et al., "Microstructure and magnetic properties of FePt—(C,SiO2) granular films deposited on MgO, MgTiO, and MgTiON underlayers", Scripta Materialia; vol. 157; Dec. 2018; https://doi.org/10.1016/j.scriptamat.2018.07.025; 5 pages.

Hung, Shih-Hsuan et al., "First-principles prediction of the morphology of L10 FePt nanoparticles supported on Mg(Ti)O for heat-assisted magnetic recording applications", Physical Review Materials; Jul. 12, 2017; https://journals.aps.org/prmaterials/pdf/10.1103/PhysRevMaterials.1.024405; 6 pages.

Deng, J. Y. et al., "Effect of TiON—MgO intermediate layer on microstructure and magnetic properties of L10 FePt—C—SiO2 films", Journal of Magnetism and Magnetic Materials; vol. 417; Nov. 1, 2016; https://doi.org/10.1016/j.jmmm.2016.05.096; 13 pages.

Tsai, Jai-Lin et al., "Switching Field Distribution in BN/FePtCAg/MgTiON and FePtCAg/MgTiOBN Films", Nanomaterials; Mar. 6, 2022; https://doi.org/10.3390/nano12050874; 13 pages.

Hung, Shih-Hsuan, "Shaping Nanostructure Using Molecules", University of New York; Department of Physics; Dec. 2018; https://etheses.whiterose.ac.uk/23493/1/Shih-Hsuan-Hung-Final-Thesis.pdf, 159 pages.

Ho, Hoan, "Control of Microstructure, Texture and Magnetic Properties of L10FePt Granular Magnetic Recording Media", Carnegie Mellon University; ProQuest Dissertations Publishing; Apr. 2014; https://www.proquest.com/openview/69daf59548ac85e58164e3a80ae83bcb/1?pq-origsite=gscholar&cbl=18750; 24 pages.

Samad, Mohammed Abdul et al., "A Novel Approach of Carbon Embedding in Magnetic Media for Future Head/Disk Interface", IEEE Transactions on Magnetics; vol. 48, Issue 5; May 2012; https://ieeexplore.ieee.org/document/6187782; 6 pages.

Shiroyama, T. et al., "Influence of MgO underlayers on the structure and magnetic properties of FePt—C nanogranular films for heat-assisted magnetic recording media"; AIP Advances; Oct. 2016; https://doi.org/10.1063/1.4964930; 11 pages.

Xu, Baoxi et al., "HAMR Media Design in Optical and Thermal Aspects"; IEEE Transactions on Magnetics; vol. 49, Issue 6; Jun. 2013; https://ieeexplore.ieee.org/document/6522295; 6 pages.

Choi, Jina et al., "Effects of Single Metal-Ion Doping on the Visible-Light Photoreactivity of TiO2"; American Chemical Society; 2010; https://pubs.acs.org/doi/10.1021/jp908088x; 10 pages.

International Search Report and Written Opinion for International Application No. PCT/US22/27235, dated Aug. 11, 2022, 10 pages.

Tsai, Jai-Lin et al., "Influence of an MgTiTaON Inserted Layer on Magnetic Properties and Microstructure of FePtAgC Films", Coatings; Apr. 8, 2019; https://doi.org/10.3390/coatings9040238; 11 pages.

Hu, J. F. et al., "HAMR Medium Structure Design and its Process for Excellent Thermal Performance", IEEE Transactions on Magnetics; vol. 50, Issue 3; Mar. 2014; https://ieeexplore.ieee.org/document/6774999; 6 pages.

Jubert, Pierre-Olivier et al., "Optimizing the Optical and Thermal Design of Heat-Assisted Magnetic Recording Media", IEEE Transactions on Magnetics; vol. 53, Issue 2; Feb. 2017; https://ieeexplore.ieee.org/document/7556254; 9 pages.

Pandey, H. et al., "Structure Optimization of FePt—C Nanogranular films for Heat Assisted Magnetic Recording Media"; IEEE Transactions on Magnetics; vol. 52, Issue 2; Feb. 2016; https://ieeexplore.ieee.org/document/7247737; 8 pages.

Hono, Kazuhiro, "FePt Nanogranular films for high density heat-assisted magnetic recording", Microelectronics & Nanoelectronics; 2022 Merck KGaA; Darmstadt, Germany; accessed Feb. 5, 2022; https://www.sigmaaldrich.com/US/en/technical-documents/technical-article/materials-science-and-engineering/microelectronics-and-nanoelectronics/fept-nanogranular-films; 4 pages.

Zhou, Bing et al., "The utilization of boron nitride (BN) for granular L10—FePt HAMR media fabrication", Applied Physics Letters; vol. 118, Issue 16; Apr. 21, 2021; https://doi.org/10.1063/5.0045901; 6 pages.

Xu, Chengchao et al., "Understanding the Growth of High-Aspect-Ratio Grains in Granular L10—FePt Thin-Film Magnetic Media", APL Materials; May 2022; vol. 10, Issue 5; https://pubs.aip.org/aip/apm/article/10/5/051105/2834965/Understanding-the-growth-of-high-aspect-ratio; 17 pages.

Zhou, Bing et al., "Fabrication of FePt/FePt—BN/FePt—SiOx Granular Film for HAMR Media on Corning Lotus™ NXT Glass Substrate", IEEE Transactions on Magnetics; vol. 58, Issue 2; Feb. 2022; https://ieeexplore.ieee.org/document/9439521; 5 pages.

Zhou, Bing, "Development of L10-ordered FePt Thin Film for Magnetic Recording Application", Carnegie Mellon University; Materials Science and Engineering; Jun. 23, 2021; https://kilthub.cmu.edu/articles/thesis/Development_of_L10-ordered_FePt_Thin_Film_for_Magnetic_Recording_Application/19229703; 24 pages.

Zhou, Bing et al., "Microstructure Analysis on Size Distribution During Film Growth in HAMR Media", IEEE Transactions on Magnetics; vol. 54, Issue 11; Nov. 2018; https://ieeexplore.ieee.org/document/8360133; 4 pages.

Hu, J.F. et al., "Microstructure and Magnetic Properties of FePt=SiO2 Perpendicular Recording Media", Physica Status Solidi A:

(56) References Cited

OTHER PUBLICATIONS

Applications and Materials Science; Oct. 2008; vol. 205, Issue 10; https://onlinelibrary.wiley.com/doi/abs/10.1002/pssa.200723037; 6 pages.
Granz, Steven D. et al., "Granular L10 FePt:X (X=Ag, B, C, SiOx, TaOx) Thin Films for Heat Assisted Magnetic Recording", The European Physical Journal B; Mar. 2013; vol. 86, Article 81; http://dx.doi.org/10.1140/epjb/e2012-30655-3; 7 pages.
Wei, D.H. et al., "Effects of SiO2 Inserted Layers on the Structure and Magnetic Properties of FePt (0 0 1) Films", Journal of Magnetism and Magnetic Materials; Sep. 2006; vol. 304, Issue 1; https://www.sciencedirect.com/science/article/abs/pii/S0304885306002629; 3 pages.
Yang, En et al., "L1o FePt-Oxide Columnar Perpendicular Media with High Coercivity and Small Grain Size", Journal of Applied Physics; Jul. 2008; vol. 104, Issue 2; https://pubs.aip.org/aip/jap/article-abstract/104/2/023904/934485/L1-FePt-oxide-columnar-perpendicular-media-with?redirectedFrom=fulltext; 3 pages.
Chen, S.C. et al., "Granular FePt—Ag Thin Films with Uniform FePt Particle Size for High-Density Magnetic Recording", Materials Science and Engineering: B; Jan. 2002; vol. 88, Issue 1; https://www.sciencedirect.com/science/article/abs/pii/S0921510701009151; 7 pages.

\* cited by examiner

MAGNETIC RECORDING MEDIUM WITH MAGNESIUM-TITANIUM OXIDE (MTO) LAYER FORMED USING PULSED DIRECT CURRENT SPUTTER DEPOSITION

FIELD

The disclosure relates, in some aspects, to magnetic recording media. More specifically, but not exclusively, the disclosure relates to magnetic recording media configured for use with heat-assisted magnetic recording (HAMR).

INTRODUCTION

Magnetic storage systems, such as a hard disk drive (HDD), are utilized in a wide variety of devices in stationary and mobile computing environments. Examples of devices that incorporate magnetic storage systems include desktop computers, portable notebook computers, portable hard disk drives, high-definition television (HDTV) receivers, television set top boxes, video game consoles, and portable media players.

A typical disk drive includes magnetic storage media in the form of one or more flat disks. The disks are generally formed of few main substances, namely, a substrate material that gives it structure and rigidity, a magnetic recording layer that holds the magnetic impulses or moments that store digital data, and media overcoat and lubricant layers to protect the magnetic recording layer. The typical disk drive also includes a read head and a write head, generally in the form of a magnetic transducer which can sense and/or change the magnetic moments stored on the recording layer of the disks.

Heat Assisted Magnetic Recording (HAMR) systems can increase the areal density of information recorded magnetically on various magnetic media. To achieve higher areal density for magnetic storage, smaller magnetic grain sizes, e.g., less than 6 nanometers (nm), may be required. In HAMR, high temperatures are applied to the media during writing to facilitate recording to small grains. The high temperatures may be achieved using a near field transducer that is coupled to a laser diode of a slider of a HAMR disk drive.

At least some magnetic recording media for use with HAMR employ an MgO—TIO (MTO) layer (which may also be referred to as a magnesium-titanium oxide layer) beneath the magnetic recording layer or layers. Issues can arise involving the tuning of the amount of TiO within the MTO to optimize magnetic performance of the media. Aspects of the present disclosure are directed to addressing these or other issues.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium is provided that includes: a substrate; a heatsink layer on the substrate; an underlayer on the heatsink layer, wherein the underlayer comprises an MgO—TIO (MTO) layer with less than 50 mol % of TiO; and a magnetic recording layer on the underlayer. In some aspects, the recording medium is configured for use with Heat Assisted Magnetic Recording (HAMR). In some aspects, the MTO layer is formed using pulsed DC sputtering. In some aspects, the mol % of TiO in the MTO is 30 mol %, i.e. the compound is MgO-30TIO. In some aspects, a second MTO underlayer may be provided, wherein the second MTO layer has at least 50 mol % of TiO, e.g., the second MTO layer may be MgO-50TIO. The second MTO layer may be formed, for example, using regular DC sputtering. That is, in some aspects, a dual-layer MTO underlayer is provided with, e.g., an MgO-30TiO layer and an MgO-50TiO layer. In some aspects, the recording medium also includes an adhesion layer, a soft underlayer (SUL), and a seed layer, in that order, between the substrate and the heatsink layer, and a thermal resistive layer between the heatsink layer and the underlayer. In some aspects, a capping layer is provided on the magnetic recording layer and a carbon overcoat (COC) is provided on the capping layer.

In another embodiment, a magnetic recording medium is provided that includes: a substrate; a heatsink layer on the substrate, the heatsink layer comprising Cr; a thermal resistive layer on the heatsink layer, the thermal resistive layer comprising $RuAlTiO_2$; an underlayer on the thermal resistive layer, wherein the underlayer comprises a first MgO—TiO layer with less than 50 mol % of TiO, sputtered using a pulsed direct current (DC); and a magnetic recording layer comprising FePt on the underlayer.

In still another embodiment, a method for manufacturing a magnetic recording medium is provided. The method includes: providing a substrate; providing a heatsink layer on the substrate; providing an underlayer comprising MTO on the heatsink layer, wherein the underlayer comprises MgO—TiO with less than 50 mol % of TiO; and providing a magnetic recording layer on the underlayer. In some aspects, the MTO underlayer is formed using pulsed DC sputtering. In some aspects, the mol % of TiO in the MTO layer is 30 mol %, i.e. the compound is MgO-30TIO. Additionally, in some aspects, a second MTO underlayer may be provided, wherein the second MTO layer has at least 50 mol % of TiO, e.g., the second MTO layer may be MgO-50TIO. The second MTO layer may be formed, e.g., using regular DC sputtering. In some aspects, the method also includes providing an adhesion layer, an SUL, and a seed layer, in that order, between the substrate and the heatsink layer, and providing a thermal resistive layer between the heatsink layer and the MTO underlayer. In some aspects, the method includes providing a capping layer on the magnetic recording layer and a COC on the capping layer.

In still yet another embodiment, a method for manufacturing a magnetic recording medium is provided that includes: providing a substrate; providing a heatsink layer on the substrate, the heatsink layer comprising Cr; providing a thermal resistive layer on the heatsink layer, the thermal resistive layer comprising $RuAlTiO_2$; providing an underlayer on the thermal resistive layer, wherein the underlayer comprises a first MgO—TiO layer with less than 50 mol % of TiO, sputtered using a pulsed direct current (DC); and providing a magnetic recording layer comprising FePt on the underlayer.

In a further embodiment, a magnetic recording medium is formed using a process comprising: providing a substrate; providing a heatsink layer on the substrate; forming an underlayer on the heatsink layer using pulsed DC sputtering, wherein the underlayer comprises MgO—TiO with less than 50 mol % of TiO; and providing a magnetic recording layer on the underlayer. In some examples, the mol % of TiO in the MTO is 30 mol %, i.e. the compound is MgO-30TIO. Additionally, in some examples, a second MTO underlayer may be formed using regular DC sputtering, wherein the second MTO layer has at least 50 mol % of TiO, e.g., the second MTO layer may be MgO-50TIO.

In still another embodiment, a magnetic recording medium is formed using a process comprising: providing a substrate; providing a heatsink layer on the substrate, the heatsink layer comprising Cr; forming a thermal resistive layer on the heatsink layer, the thermal resistive layer comprising $RuAlTiO_2$; forming an underlayer on the heatsink layer using pulsed direct current (DC) sputtering, wherein the underlayer comprises a first MgO—TiO layer with less than 50 mol % of TiO; and providing a magnetic recording layer comprising FePt on the underlayer.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

Figure 1:
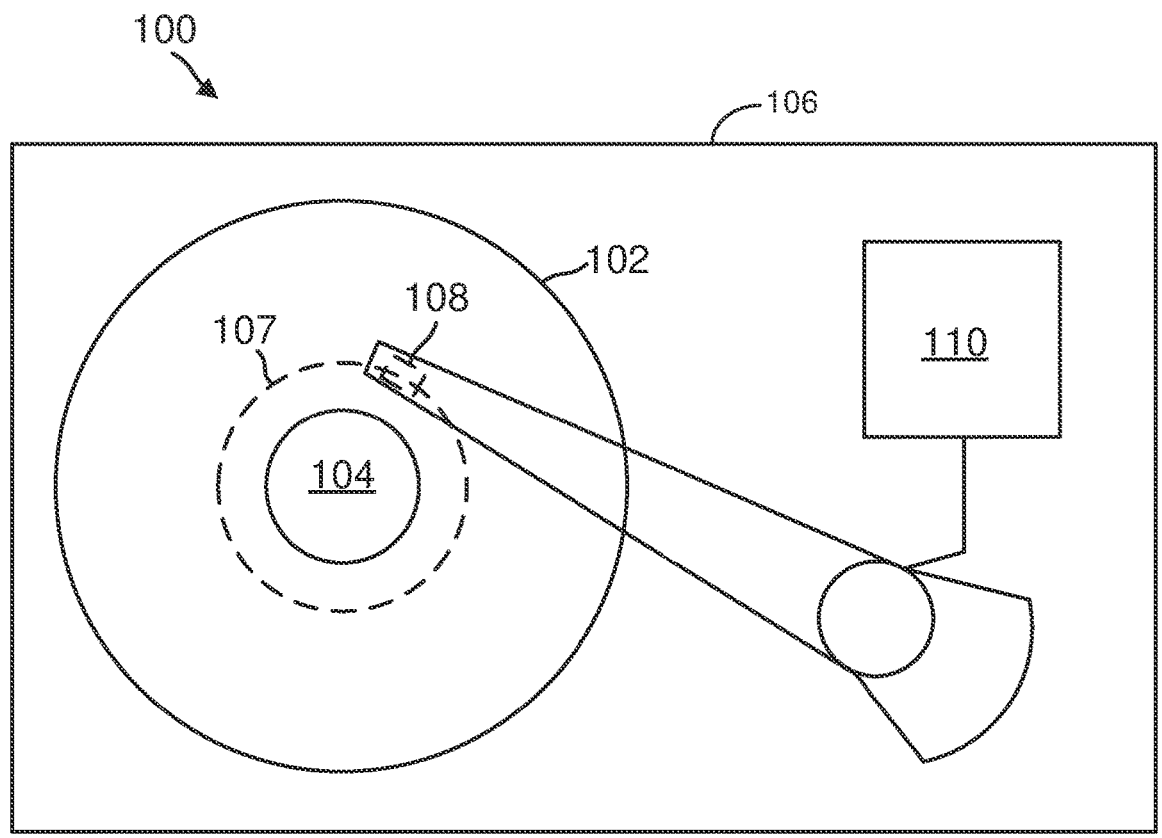
FIG. 1 is a top schematic view of an exemplary disk drive configured for heat-assisted magnetic recording (HAMR) including a slider and a HAMR medium having an MgO—TiO (MTO) underlayer, wherein the underlayer has less than 50 mol % TiO, in accordance with an aspect of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for providing a magnetic recording medium such as a Heat-Assisted Magnetic Recording (HAMR) medium that can, among other features, provide for optimized or at least improved magnetic performance within the HAMR medium. Note that HAMR is a type of Energy-Assisted Magnetic Recording (EAMR), which is a broader term that covers HAMR as well as Microwave Assisted Magnetic Recording (MAMR). At least some aspects of the present disclosure are not limited to HAMR and are applicable to EAMR.

In at least some HAMR media, an underlayer is provided beneath a magnetic recording layer (MRL), where the underlayer is formed of magnesium oxide (MgO) and titanium oxide (TiO) and may be referred to as an MTO layer (or a magnesium-titanium oxide layer). The MTO layer may be provided, for example, to provide a thermal barrier within the HAMR media while also assisting in nucleation of FePt grain shaped crystals so as to permit proper crystal growth within the MRL. The MTO layer is often formed using direct current (DC) sputtering. DC sputtering is a thin film deposition technique that uses ionized gas molecules to vaporize (sputter) molecules from a target material into a plasma and then onto the structure intended to receive the film. For example, MgO and TiO molecules are sputtered from a suitable target material to form a thin MTO layer or film on a thermal resistive layer of a HAMR medium, which in turn is atop a heatsink layer. Thereafter, magnetic recording layers are formed or grown on the MTO layer.

DC sputtering is often used to deposit MTO because it is relatively low cost and fast compared to other deposition techniques. However, when using DC sputtering, the mol % of TiO within the MTO typically must be at least 50 mol % (e.g., for sufficient electrical conductivity needed for DC sputter), otherwise sputtering is not successful. For example, excessive arcing and spitting of particles can occur when attempting DC sputtering of MgO—TiO with less than 50 mol % of TiO. (Herein, mole percentage, or mol %, is defined as the percentage that the moles of a particular component are to the total moles that are in the compound.)

It would be advantageous to instead provide an MTO layer with less than 50 mol % of TiO, as such may provide various advantages, e.g., a flatter MRL signal-to-noise (SNR) response with increasing MTO thickness to provide a wider operating window.

Herein, to address these and other issues, a magnetic recording medium is provided wherein an MTO underlayer is formed using pulsed DC sputtering rather than regular (non-pulsed) DC sputtering. When using pulsed DC sputtering, the mol % of TiO within the MTO may be less than 50% and, in some examples, may be 30 mol % or 35 mol %. By using pulsed DC sputtering, the amount of TiO in the MTO can be tuned to a desired mol % below 50 mol % to achieve desired HAMR media characteristics such as optimizing magnetic performance.

Pulsed DC sputtering is similar to conventional DC sputtering except the DC power source is pulsed. For example, the DC voltage may be pulsed in the 10-350 KHz range with duty cycles in the 50-90% range. During an "on time" portion of the duty cycle, a negative pulse of a few hundred volts may be applied to the target to initiate sputtering. The gas in the vacuum chamber is ionized from collisions with the target surface sputtering off molecules or atoms. Sputtering only takes place while the "on time" negative pulse is applied to the target. At the end of the high voltage "on time" portion of the duty cycle, the voltage is reversed with a low voltage positive charge. This "reverse time" is shorter than the "on time" duration. During the positive voltage (reverse) portion of the duty cycle, the surface of the target is discharged, thus preparing it for the next negative voltage pulse. In the examples described herein, the pulse DC frequency is 200 kHz (e.g., 5.0 us per cycle) and the reverse time is 2.0 ρs.

In some examples, the magnetic recording medium may include: a substrate; a heatsink layer on the substrate, an MTO underlayer on the heatsink layer, wherein the MTO underlayer has less than 50 mol % of TiO, and a magnetic recording layer on the MTO layer. In some examples, the mol % of TiO in the MTO is 30 mol %, i.e., the compound is MgO-30TIO. Additionally, in some examples, a second MTO layer may be provided, wherein the second MTO layer has at least 50 mol % of TiO, e.g., the second MTO layer may be MgO-50TIO. The second MTO layer may be formed, for example, using regular DC sputtering. That is, a dual-layer MTO underlayer may be provided with, e.g., an MgO-30TIO layer and a MgO-50TiO layer. Note that additional layers or films may be provided in the HAMR medium including, e.g., an adhesion layer, a soft underlayer (SUL), a seed layer, a thermal resistive layer, a capping layer and a preferentially etched carbon overcoat (COC), to be described below. (Note also that although the MTO layer is referred to herein as an "underlayer," the MTO layer might be referred to by other names as well, such as an "interlayer layer," a "seed layer," or the like.)

Among other advantages, by using an MTO layer with less than 50 mol % of TIO, e.g., MgO-30TIO, the flatter SNR response with increasing MTO thickness discussed above is achieved. Also, surprisingly, a finer grain size can be achieved and a thicker MTO can be used.

Illustrative Examples and Embodiments

FIG. 1 is a top schematic view of a data storage device 100 (e.g., disk drive or magnetic recording device) configured for magnetic recording and comprising a slider 108 and a magnetic recording medium 102 that includes an MTO layer beneath a magnetic recording layer, with the MTO layer formed from pulsed DC sputtering and includes less than 50 mol % of TiO. In illustrative examples, the magnetic recording medium 102 includes a HAMR medium. The laser (not visible in FIG. 1 but see 114 in FIG. 2) is positioned with a magnetic head/slider 108. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an exemplary HAMR system is shown, at least some aspects of the disclosure may be used in other HAMR or EAMR magnetic data recording systems or in non-HAMR or non-EAMR magnetic data recording systems, including shingle-written magnetic recording (SMR) media, perpendicular magnetic recording (PMR) media, or microwave assisted magnetic recording (MAMR) media.

Figure 2:
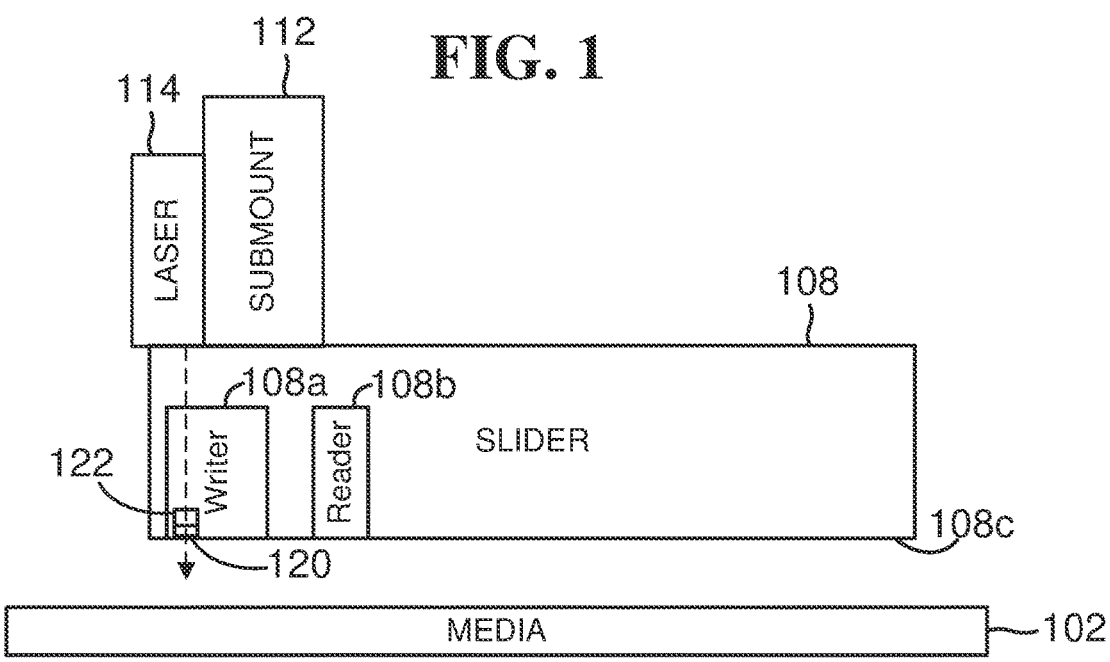
FIG. 2 is a side schematic view of the exemplary slider and HAMR medium of FIG. 1 in accordance with an aspect of the disclosure.

FIG. 2 is a side schematic view of the slider 108 and magnetic recording medium 102 of FIG. 1. The magnetic recording medium 102 includes the MTO layer beneath the magnetic recording layer (wherein the MTO underlayer includes less than 50 mol % of TIO). The slider 108 may comprise a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of Si or Si cladding 120. This layer is optional.

In operation, the laser 114 is configured to generate and direct light energy to a waveguide (e.g., along the dashed line) in the slider which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the media 102 within or near the write element 108a, and near the read element 108b. The anticipated recording temperature is in the range of about 350° C. to 400° C. In the aspect illustrated in FIG. 2, the laser directed light is disposed within the writer 108a and near a trailing edge of the slider. In other aspects, the laser directed light may instead be positioned between the writer 108a and the reader 108b.

FIGS. 1 and 2 illustrate a specific example of a HAMR system. In other examples, the magnetic recording medium 102 can be used in other suitable HAMR systems (e.g., with other sliders configured for HAMR).

Figure 3:
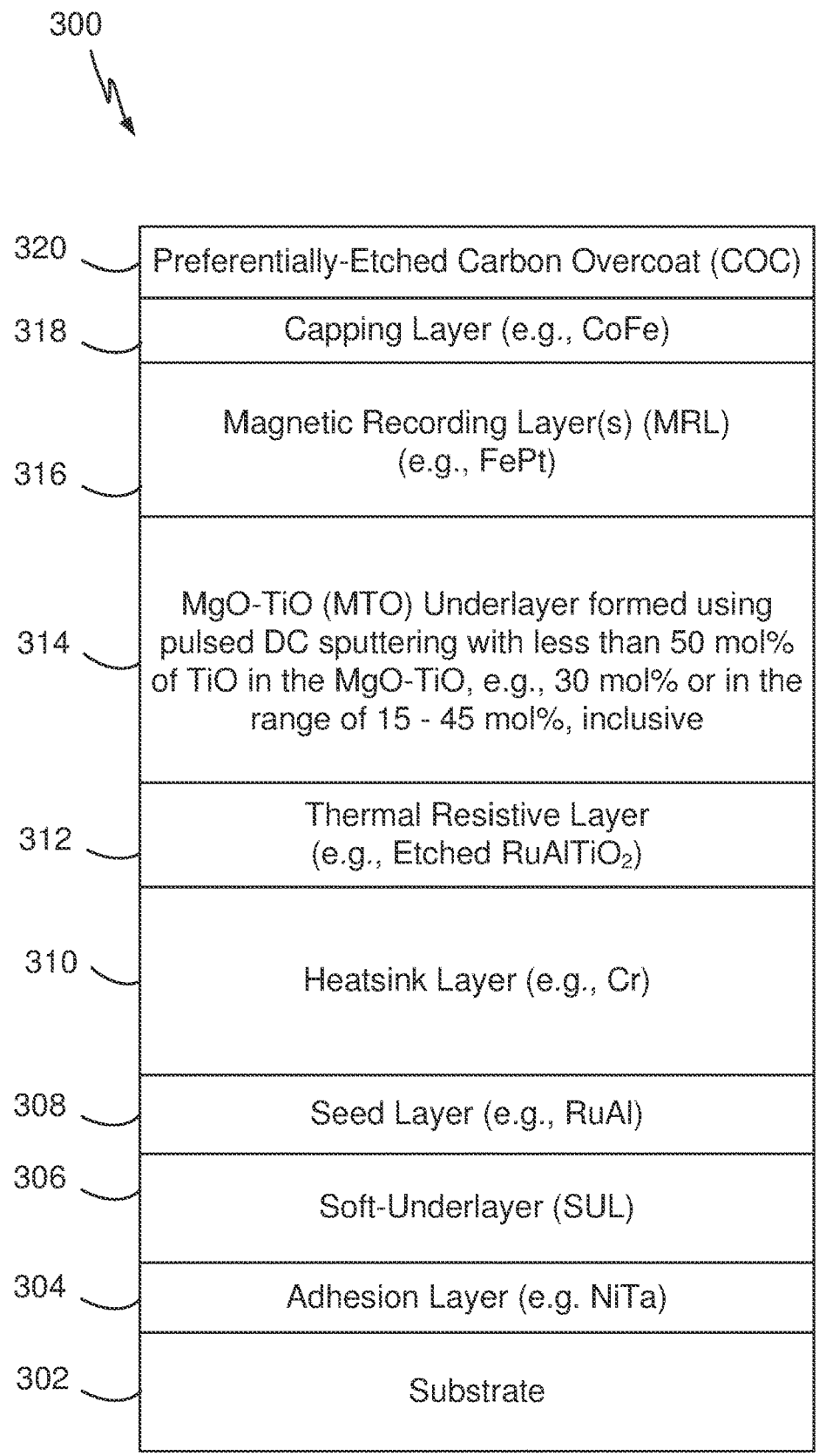
FIG. 3 is a side schematic view of an exemplary HAMR medium that includes, among other layers, an MTO underlayer that includes less than 50 mol % of TiO, in accordance with an aspect of the disclosure.

FIG. 3 is a side schematic view of an exemplary HAMR medium 300 in accordance with an aspect of the disclosure. The HAMR medium 300 of FIG. 3 has a stacked structure with a substrate 302 at a bottom/base layer, an adhesion layer 304 (which may be formed, e.g., of NiTa) on the substrate 302, a soft underlayer (SUL) 306 on the adhesion layer 304, a seed layer 308 (which may be formed, e.g., of RuAl) on the SUL 306, a heatsink layer 310 (which may be formed, e.g., of Cr) on the seed layer 308, an etched thermal resistive layer 312 (which may be formed, e.g., of RuAlTiO$_2$ and etched to reduce roughness (e.g., using a New Carbon Technology system of Intevac™), an MgO—TIO (MTO) underlayer 314 (wherein the MTO underlayer 314 is formed as a pulsed DC sputtered layer that includes less than 50 mol % of TiO, e.g., 30 mol % or in the range of 15 mol %-45 mol %, inclusive) on the thermal resistive layer 312. In some examples, the MTO underlayer 314 layer is: MgO-30TiO or MgO-35TIO. In some aspects, the underlayer 314 layer may be described as: MgO-xTIO, where, in some examples, x is the range of 15-45 mol %, inclusive, and, in some examples, x is in the range of 25-35 mol %, inclusive, and, in some examples, x is either 30 mol % or 35 mol %.

Herein, a pulsed DC sputtered layer may be any film, layer, material or structure that is formed using pulsed DC sputtering. A pulsed DC sputtered layer thus has a configuration or structure associated with pulsed DC sputtering. A pulsed DC sputtered layer may also be regarded as a layer that is configured in accordance with pulsed DC sputtering. The configuration or structure of a pulsed DC sputtered layer differs at least somewhat from the configuration or structure of a layer formed using a different deposition technique, such as non-pulsed DC sputtering or RF sputtering, at least at a microscopic or sub-microscopic level.

Continuing with the description of FIG. 3, a magnetic recording layer (MRL) 316 (which may be formed, e.g., of FePt) is on the MTO underlayer 314. A capping layer 318 (which may be formed, e.g., of CoFe) is on the MRL 316. A preferentially etched carbon overcoat layer (COC) 320 is on the capping layer 318, that is, the COC 320 is formed on the capping layer 318 and then etched using a preferential etching process. (Preferential etching is also referred to as anisotropic or selective etching and differs from polish etching.) The preferentially etched COC includes an etching step prior to carbon deposition to reduce media surface roughness. Although not shown, an additional lubricant layer may be on the COC layer 320. Note that the layers in the figure (or in other figures herein) are not shown to scale.

Note that the terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

In some aspects, the layers have the following thicknesses: the substrate 302 thickness is in the range of 0.5 mm to 0.635 mm; the adhesion layer 304 thickness is in the range of 45 nm to 180 nm; the SUL 306 thickness is in the range of 85 nm to 130 nm; the seed layer 308 thickness is in the range of 2 nm to 34 nm; the heatsink layer 310 thickness is in the range of 55 nm to 100 nm; the etched thermal resistive layer 312 thickness is in the range of 0.5 nm to 2.0 nm; the MTO underlayer 314 has a thickness is in the range of 1 to 4 nm (or, in some examples, in the range of 2.5 nm to 3.5 nm), with a thickness of 3 nm preferred in some examples); the MRL 316 thickness is in the range of 8 nm to 11 nm; the capping layer 318 thickness is in the range of 1 nm to 3 nm; the preferentially etched COC 320 thickness is in the range of 32 Å to 40 Å; the lubricant layer thickness (if provided) is in the range of 7 Å to 9.5 Å. Otherwise routine experimentation can be used to determine suitable or preferred layer thicknesses and/or suitable or preferred compound percentage concentrations for use within practical HAMR systems based on the particular characteristics of the system, such as its operating temperature, the desired areal density of data, etc.

In some examples, the substrate 302 has an outer diameter (i.e., OD) of about 97 mm and a thickness of about 0.5 mm. In other examples, the OD may be 95 mm or 95.1 mm. (Generally speaking, such disks are all referred to as "3.5 inch" disks.) In some aspects, the substrate 302 may be made of one or more materials such as an Al alloy, NiP-plated Al, glass, glass ceramic, and/or combinations thereof.

In some aspects, the adhesion layer 304 (which might alternatively be referred to as a pre-seed layer) is used to reduce delamination of layers or films deposited over the adhesion layer. The adhesion layer 304 may be a metallic alloy, such as NiTa (as shown, or CrTi), etc.

In some aspects, the SUL 306 can be made of one or more materials, such as Co, Fe, Mo, Ta, Nb, B, Cr, or other soft magnetic materials, or combinations thereof. The SUL 306 may include an amorphous compound or combination of Co and Fe (e.g., a CoFe alloy) with the addition of one or more elements from Mo, Nb, Ta, W, and B. The SUL 306 may be configured to support magnetization of the magnetic recording layer structure 316 during data storage operations. More specifically, the SUL 306 may be configured to provide a return path for a magnetic field applied during a write operation.

In some aspects, the seed layer 308 is used to create a growth template for the subsequently deposited films including the heatsink layer 310 and the MRL 316. Functional goals for the seed layer 308 include small grain size and good crystallographic texture, both of which may be desirable for good media recording performance.

In some aspects, the heatsink layer 310 can be made of one or more materials such as Cr, as shown, or Ag, Al, Au, Cu, Mo, Ru, W, CuZr, MoCu, AgPd, CrRu, CrV, CrW, CrMo, CrNd, NiAl, NiTa, combinations thereof, and/or other suitable materials known in the art.

In some aspects, the thermal resistive layer 312 is deposited to provide thermal resistance to the heatsink layer 310. As noted above, the thermal resistive layer 312 may be etched to reduce roughness.

In some aspects, the above-described MTO underlayer 314 is provided, e.g., to provide a thermal barrier and to assist in nucleation so as to permit proper crystal growth within the MRL 316 so that the MRL 316 will have good crystallographic texture with small grains. By forming the MTO using pulsed DC sputtering with less than 50 mol % of TiO in the MTO, finer grain sizes may be achieved as compared to regular (non-pulsed) DC sputtering with 50 mol % of TiO in the MTO and a thicker MTO layer (e.g., for better thermal resistance) may be used. In some examples, media grain pitch is 0.2-0.3 nm smaller for MgO-30TiO as compared to MgO-50TiO, although FePt texture may be wider by 0.4 deg in rocking curve (RC) full width half maximum (FWHM) measurements, and FePt X-ray diffraction (XRD) intensity may be lower by 10%.

In some aspects, the MRL 316 includes one or more magnetic recording layers for storing data magnetically, not explicitly shown in in FIG. 3. For example, the MRL 316 may include magnetic recording sub-layers and exchange control sub-layers (ECLs). Collectively, the sub-layers form an MRL structure 316 that may be, e.g., 100-200 angstroms (Å) thick. In some aspects, the MRL 316 may be made of FePt. In some aspects, the MRL 316 may be made instead of an alloy selected from FePtY, where Y is a material selected from Cu, Ni, and combinations thereof. In other aspects, the MRL 316 may be made instead of a CoPt alloy. In some aspects, the MRL 316 may be formed of high anisotropy $L1_0$ FePt with segregants such as C, BN, $SiO_2$, Ag, and combinations thereof. In some aspects, the MRL is a four layer MRL. Each layer of the MRL may have segregants with the amount of segregant varying from layer to layer within the MRL.

In some aspects, the CoFe capping layer 318 may be made instead of just Co, Pt, or Pd. In one example, the capping layer 318 can be a bi-layer structure having a top layer including Co and a bottom layer including Pt or Pd. In addition to the Co/Pt and Co/Pd combinations of the top layer and the bottom layer, specific combinations of the top layer materials and the bottom layer materials may include, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au, Fe/Cu, Fe/Mo, Fe/Pd, Ni/Au, Ni/Cu, Ni/Mo, Ni/Pd, Ni/Re, etc. In additional examples, top layer materials and bottom layer materials include any combination of Pt and Pd (e.g., alloys), or any of the following elements, alone or in combination: Au, Ag, Al, Cu, Ir, Mo, Ni, Os, Ru, Ti, V, Fe, Re, and the like.

In some aspects, if a lubricant layer is also provided on the COC 320, the lubricant layer (not shown in the figure) may be made of a polymer-based lubricant material.

Figure 4:
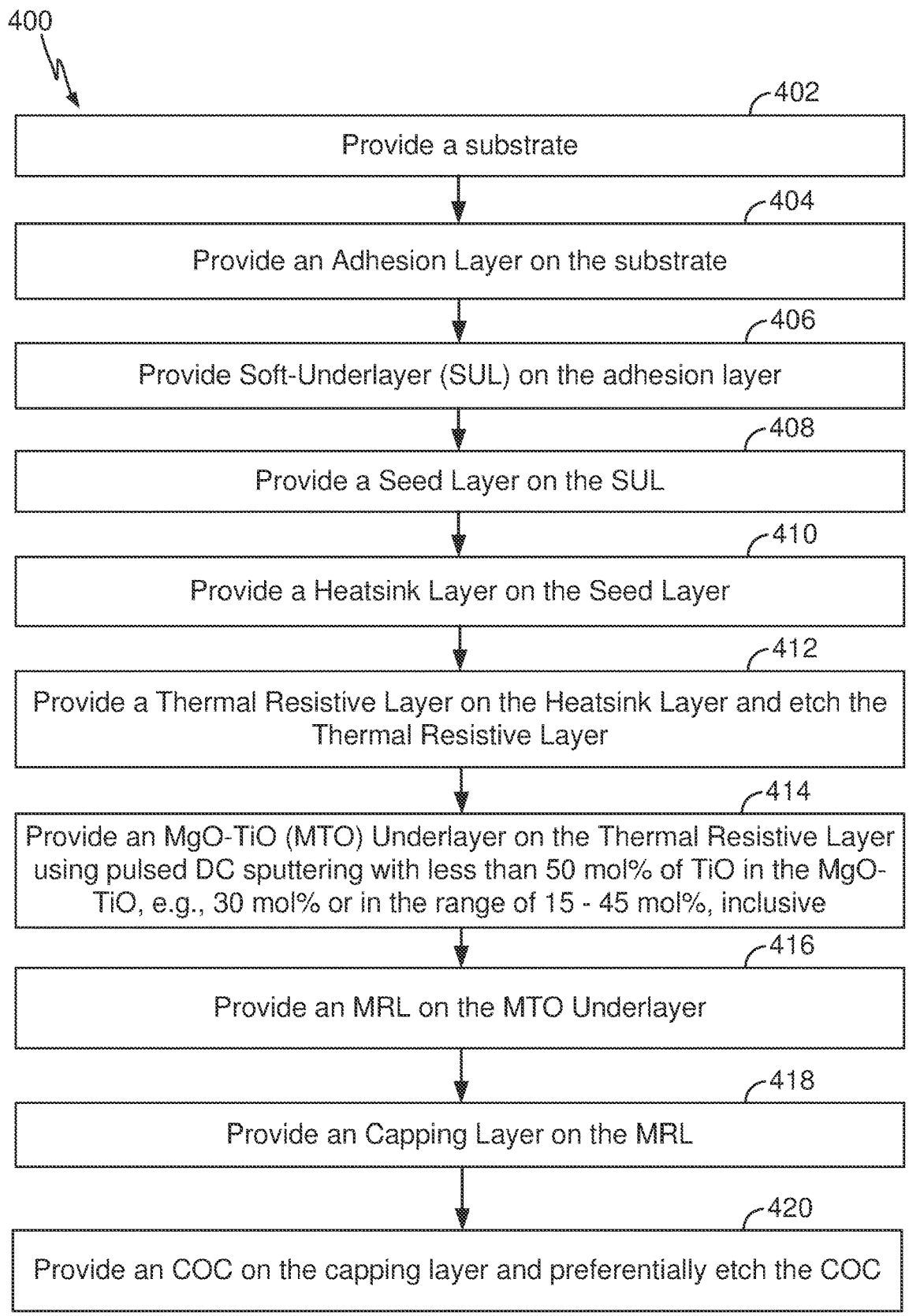
FIG. 4 is a flowchart of an exemplary process for fabricating a HAMR medium that includes an MTO underlayer that includes less than 50 mol % of TiO, in accordance with some aspects of the disclosure.

FIG. 4 is a flowchart of a process 400 for fabricating a HAMR medium with an MTO layer in accordance with some aspects of the disclosure. In one aspect, the process 400 can be used to fabricate the HAMR media described above in relation to FIG. 3. In block 402, the process provides a substrate. In block 404, the process provides an adhesion layer (which may be formed, e.g., of NiTa) on the substrate. In block 406, the process provides an SUL on the adhesion layer. In block 408, the process provides a seed layer (which may be formed, e.g., of RuAl) on the SUL. In block 410, the process provides a heatsink layer (which may be formed, e.g., of Cr) on the seed layer. In block 412, the process provides a thermal resistive layer (which may be formed, e.g., of $RuAlTiO_2$) and then etches the thermal resistive layer. In block 414, the process provides an MTO underlayer (wherein the MTO underlayer 314 is formed from pulsed DC sputtering and includes less than 50 mol % of TiO, e.g., 30 mol % or in the range of 15 mol %-45 mol %, inclusive) on the thermal resistive layer. In block 416, the process provides an MRL (which may be formed, e.g., of FePt) on the MTO underlayer. In block 418, the process provides a capping layer 318 (which may be formed, e.g., of CoFe) on the MRL. In block 420, the process provides a COC on the capping layer and then preferentially etches the COC. Although not shown, the process may also provide a lubricant layer on the COC. Additional or alternative exemplary materials are listed above.

Thus, FIGS. 3 and 4 illustrate HAMR media and methods where an MTO layer is provided that is formed from pulsed DC sputtering and includes less than 50 mol % of TiO. e.g., 30 mol % or in the range of 15-45 mol %, inclusive.

In the next example, an additional (second) MTO layer is provided that is formed from non-pulsed DC sputtering and has 50 mol % (or more) of TiO.

Figure 5:
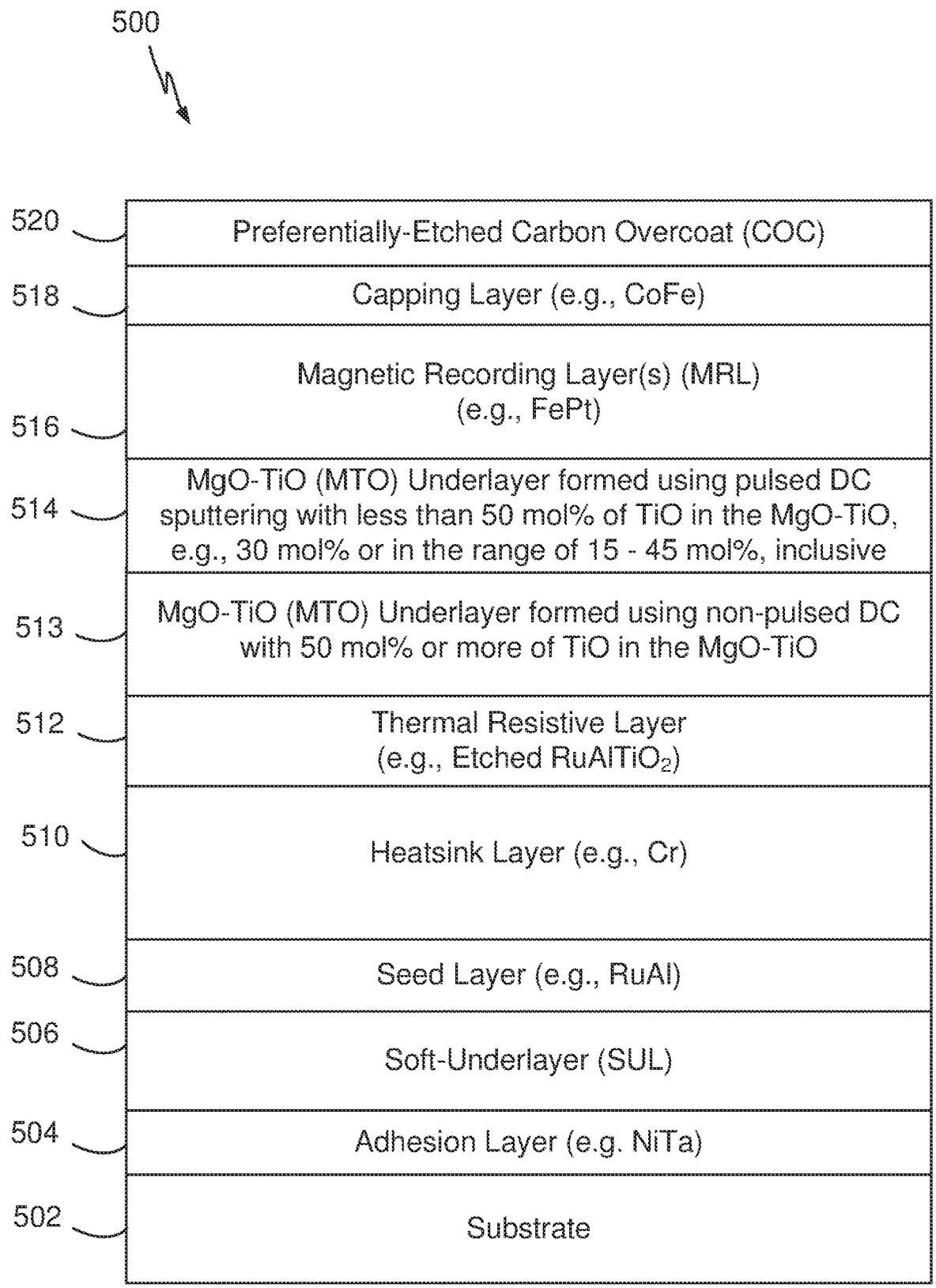
FIG. 5 is a side schematic view of an exemplary HAMR medium that includes, among other layers, an MTO underlayer that includes less than 50 mol % of TiO and another MTO layer that includes 50 mol % or more of TiO, in accordance with an aspect of the disclosure.

FIG. 5 is a side schematic view of an exemplary HAMR medium 500 in accordance with an aspect of the disclosure that includes a first MTO underlayer that is a pulsed DC sputtered MTO layer with less than 50 mol % TiO and a second MTO underlayer that is non-pulsed DC sputtered MTO layer with 50 mol % (or more) TiO. The second MTO underlayer is between the pulsed DC sputtered MTO layer and the thermal resistive layer.

Herein, a non-pulsed DC sputtered layer (or regular DC sputtered layer) may be any film, layer, material or structure that is formed using non-pulsed DC sputtering. A non-pulsed DC sputtered layer thus has a configuration or structure associated with non-pulsed DC sputtering. A non-pulsed DC sputtered layer may also be regarded as a layer that is configured in accordance with non-pulsed DC sputtering. The configuration or structure of a non-pulsed DC sputtered layer differs at least somewhat from the configuration or structure of a layer formed using a different deposition technique, such as pulsed DC sputtering or RF sputtering, at least at a microscopic or sub-microscopic level.

As with the HAMR medium of FIG. 3, the HAMR medium 500 of FIG. 5 has a stacked structure with a substrate 502 at a bottom/base layer, an adhesion layer 504 on the substrate 502, an SUL 506 on the adhesion layer 504, a seed layer 508 on the SUL 506, a heatsink layer 510 on the seed layer 508, an etched thermal resistive layer 512, and an MTO underlayer 514 (formed using pulsed DC with less than 50 mol % of TiO in the MgO—TIO, e.g., 30 mol % or in the range of 15-45 mol %, inclusive). In some examples, the MTO underlayer 514 layer is: MgO-30TIO or MgO-35TIO. In some aspects, the MTO underlayer 514 layer may be described as: MgO-xTIO, where, in some examples, x is the range of 15-45 mol %, inclusive, and, in some examples, x is in the range of 25-35 mol %, inclusive, and, in some examples, x is either 30 mol % or 35 mol %. The MTO underlayer 514 is on an intervening (second) MTO underlayer 513, which is formed using non-pulsed DC with 50 mol % (or more) of TiO. In some examples, the non-pulsed DC MTO underlayer 513 layer may be: MgO-yTIO, where y is 100-x. An MRL 516 is on the MTO underlayer 514, a capping layer 518 is on the MRL 516, and a preferentially etched COC 520 is on the capping layer 518. Although not shown, an additional lubricant layer may be on the COC layer 520. The layers are again not shown to scale. See, above, for further information regarding exemplary compounds that may be used in the various layers. Note that the two MTO underlayers can be instead deposited in reverse order, i.e., with the layer 513 above layer 514.

Figure 6:
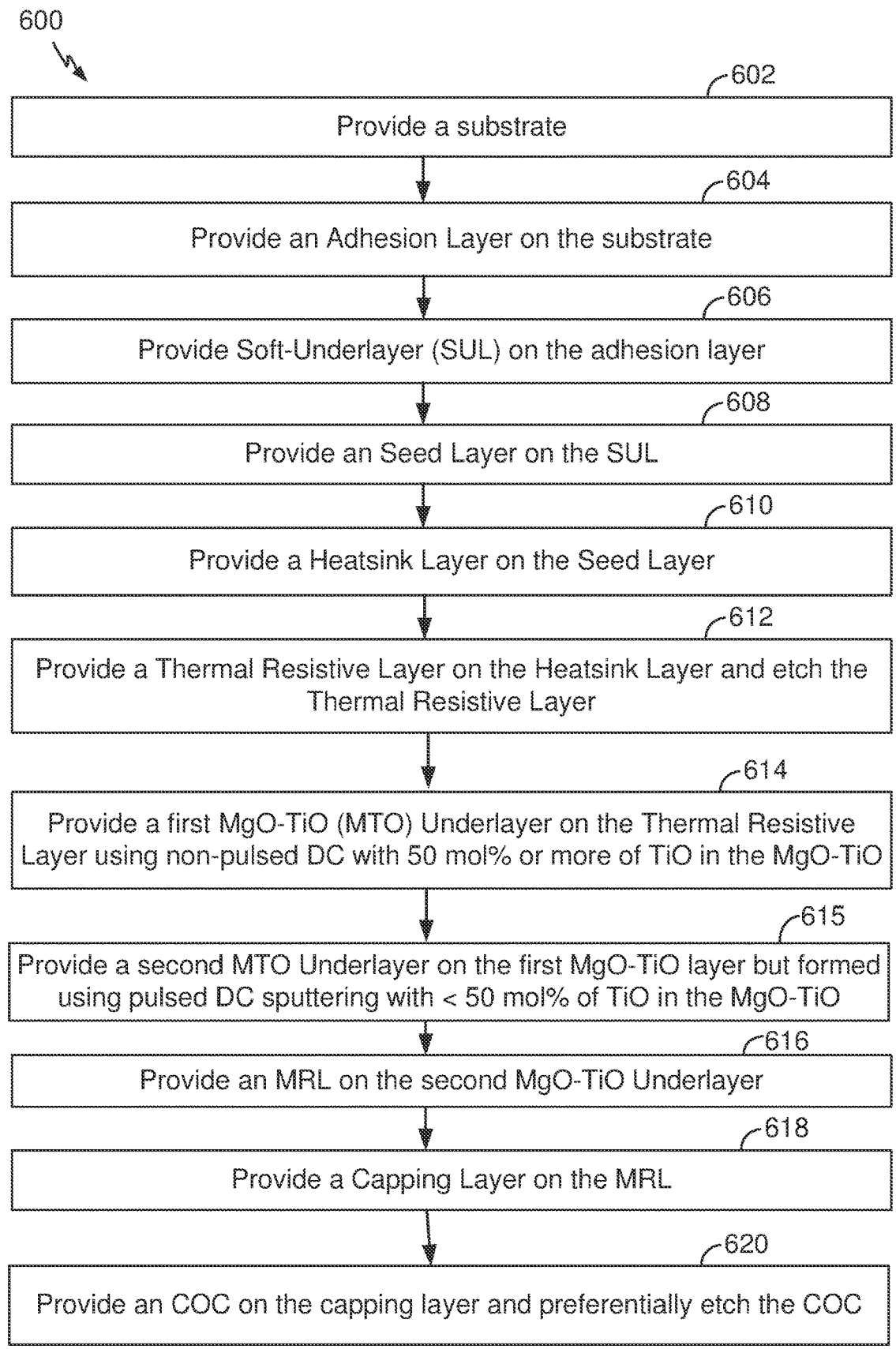
FIG. 6 is a flowchart of an exemplary process for fabricating a HAMR medium that includes an MTO underlayer that includes less than 50 mol % of TiO and another MTO layer that includes 50 mol % or more of TiO, in accordance with some aspects of the disclosure.

FIG. 6 is a flowchart of a process 600 for fabricating a HAMR medium with a pulsed DC sputtered MTO layer and a non-pulsed DC sputtered MTO layer in accordance with some aspects of the disclosure. In one aspect, the process 600 can be used to fabricate the HAMR media described above in relation to FIG. 5. In block 602, the process provides a substrate. In block 604, the process provides an adhesion layer (which may be formed, e.g., of NiTa) on the substrate. In block 606, the process provides an SUL on the adhesion layer. In block 608, the process provides a seed layer (which may be formed, e.g., of RuAl) on the SUL. In block 610, the process provides a heatsink layer (which may be formed, e.g., of Cr) on the seed layer. In block 612, the process provides a thermal resistive layer (which may be formed, e.g., of $RuAlTiO_2$) and then etches the thermal resistive layer. In block 614, the process provides a non-pulsed DC sputtered MTO underlayer on the thermal resistive layer with 50 mol % (or more) of TiO. In block 615, the process provides a pulsed DC sputtered MTO underlayer on the non-pulsed DC sputtered MTO underlayer with the pulsed DC sputtered MTO layer having less than 50 mol % TiO in the MgO—TiO, e.g., 30 mol % or in the range of 15-45 mol %, inclusive. In block 616, the process provides an MRL (which may be formed, e.g., of FePt) on the pulsed DC sputtered MTO underlayer. In block 618, the process provides a capping layer 318 (which may be formed, e.g., of CoFe) on the MRL. In block 620, the process provides a COC on the capping layer and then preferentially etches the COC. Although not shown, the process may also provide a lubricant layer on the COC. Additional or alternative exemplary materials are listed above. Again, note that the two MTO underlayers can be instead deposited in reverse order, as discussed above.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. Unless otherwise indicated, the deposition of at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD), low pressure chemical vapor deposition (LPCVD) and atomic layer chemical vapor deposition (ALCVD). In other aspects, other suitable deposition techniques known in the art might also be used.

Figure 7:
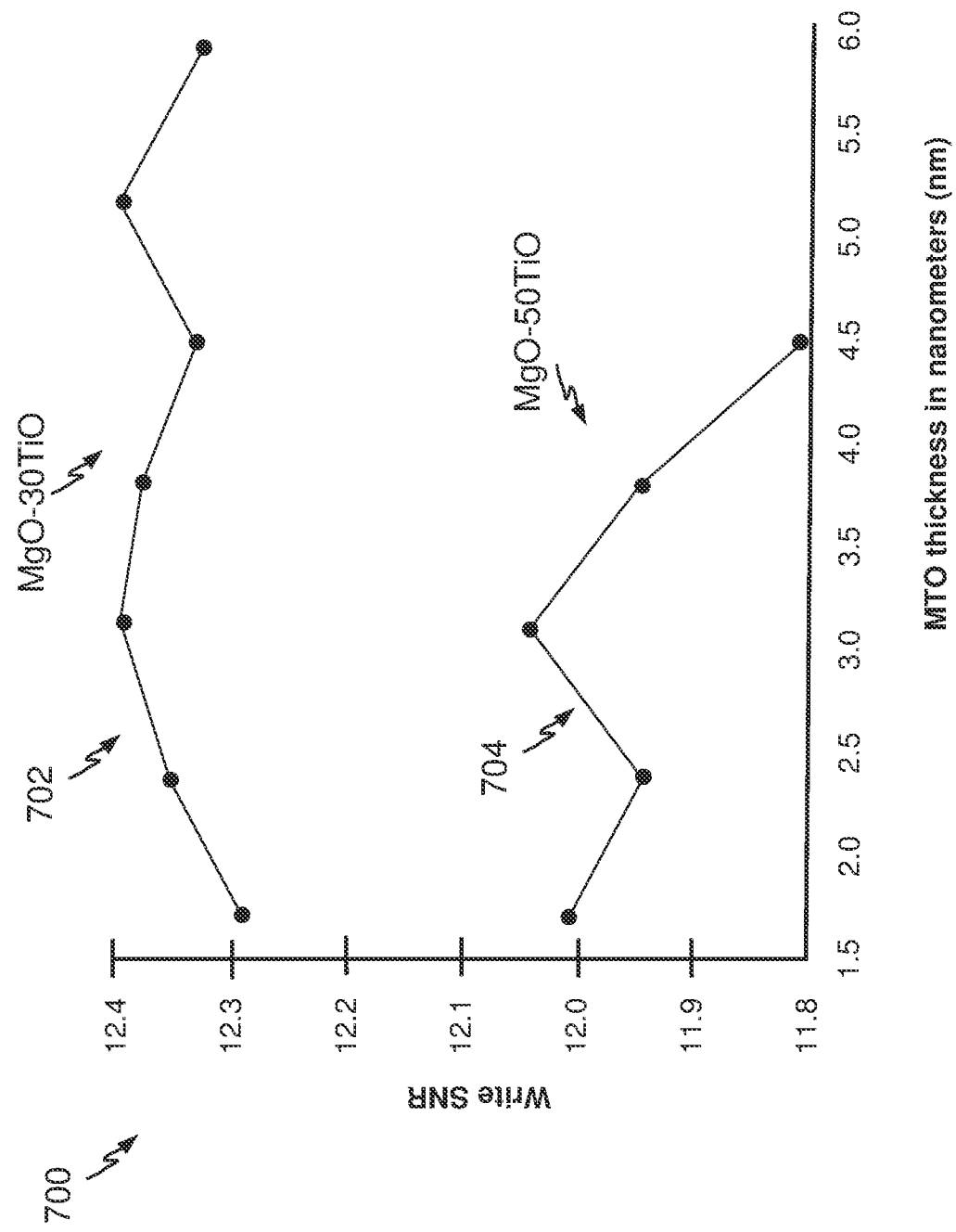
FIG. 7 is a graph showing exemplary write signal-to-noise (SNR) values for a HAMR medium with an MTO layer with 30 mol % of TiO, as compared to an HAMR medium with a single MTO layer with 50 mol % of TiO, in accordance with an aspect of the disclosure.

FIG. 7 is a graph 700 that illustrates an example of a comparison of write SNR values (shown on the y-axis) of a HAMR media (as in FIG. 3) for various MTO thickness values (shown on the x-axis) for MgO-30TIO 702, as compared to SNR values for a similar HAMR media but with MgO-50TIO, where the MgO-30TiO was formed using pulsed DC sputtering and the MgO-50TiO was formed using non-pulsed DC sputtering. The values were obtained using tests performed on a Guzik™ spinstand machine. As shown, the MgO-30TIO HAMR media has better SNR values at the MTO thicknesses shown in the graph and also provides a flatter or more uniform SNR response with increasing MTO thickness. In some examples, MgO-30TiO provides +0.4 dB SNR for write operations and +0.3 dB SNR for read operations as compared to MgO-50TiO.

Figure 8:
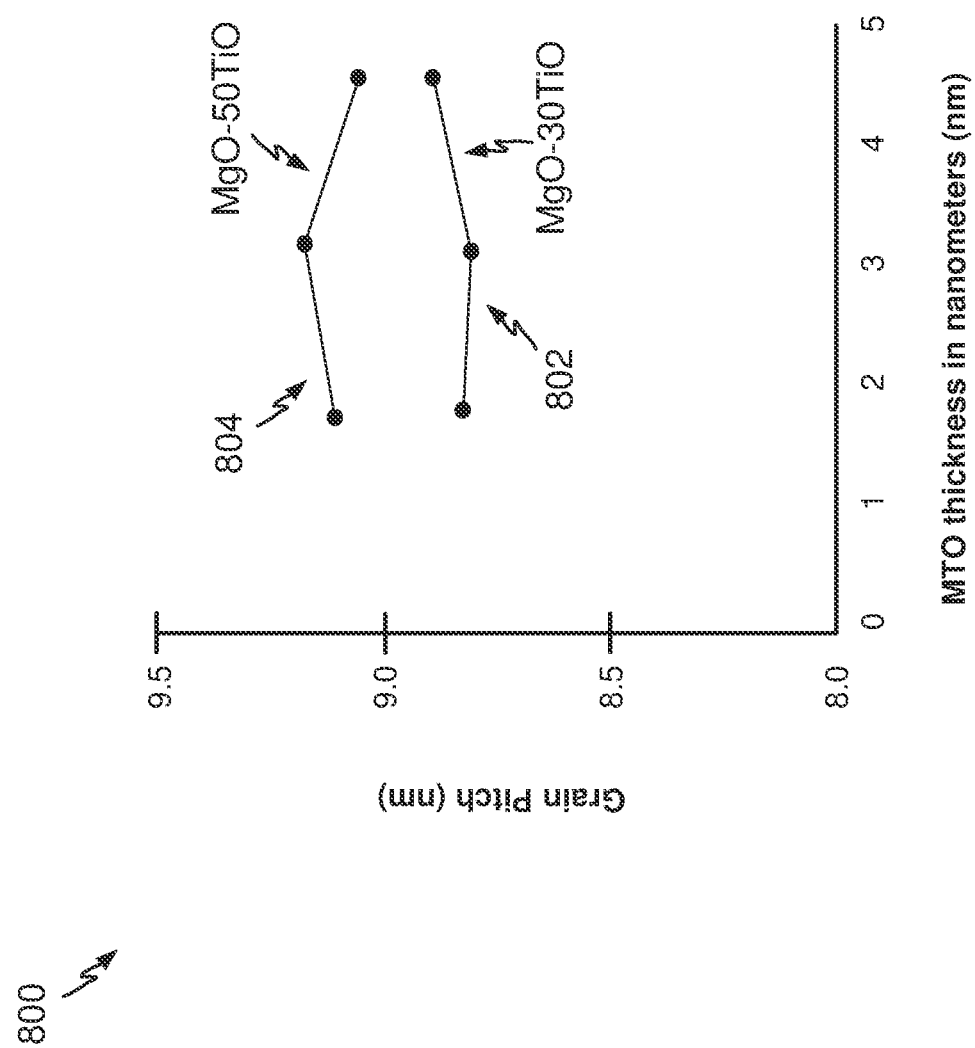
FIG. 8 is a graph showing exemplary grain pitch for a HAMR medium with an MTO layer with 30 mol % of TiO, as compared to a HAMR medium with a single MTO layer with 50 mol % of TiO, in accordance with an aspect of the disclosure.

FIG. 8 is a graph 800 that illustrates an example of a comparison of grain pitch in nm (shown on the y-axis) of a HAMR media (as in FIG. 3) for various MTO thickness values (shown on the x-axis) for MgO-30TIO 802, as compared to grain pitch for a similar HAMR media but with MgO-50TIO, where the MgO-30TiO was formed using pulsed DC sputtering and the MgO-50TiO was formed using non-pulsed DC sputtering. The values were obtained using a scanning electron microscope (SEM) test. As shown, the MgO-30TIO HAMR media has better grain pitch at all MTO thicknesses in the range of 2.0 to 4.5 nm. While the improvements shown in FIG. 8 and FIG. 7 might appear relatively small, they provide for non-trivial increases in areal recording density, which are prized in the art.

Additional Examples and Embodiments

Figure 9:
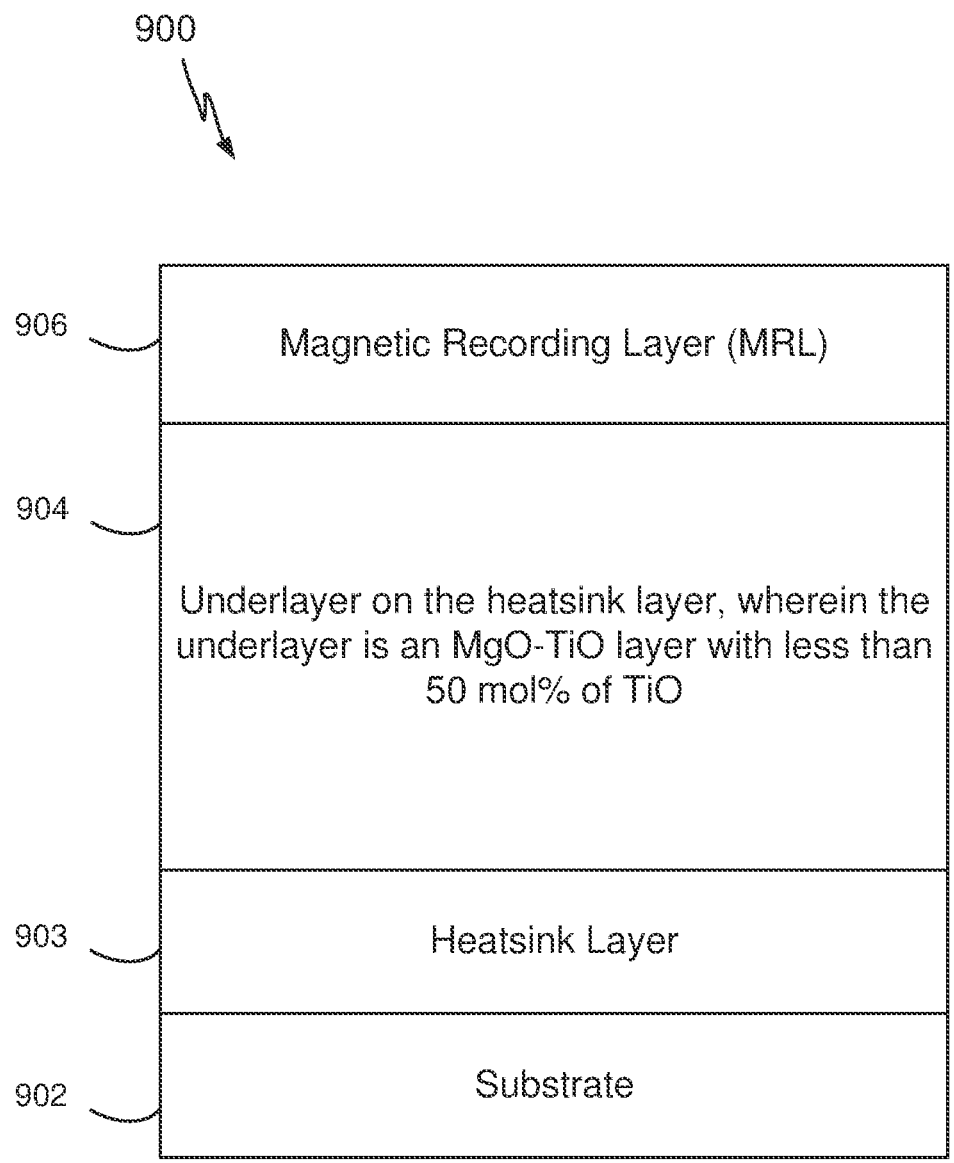
FIG. 9 is a side schematic view of an exemplary magnetic recording medium that includes an MTO underlayer with less than 50 mol % of TiO, in accordance with some aspects of the disclosure.

FIG. 9 is a side schematic view of an exemplary HAMR medium 900 in accordance with another aspect of the disclosure. The HAMR medium 900 has a stacked structure with a substrate 902, a heatsink layer 903 on the substrate, an underlayer 904 on the heatsink layer 903, wherein the underlayer is an MgO—TiO layer with less than 50 mol % of TiO (such as the pulsed DC sputtered MgO—TiO layers described above) and an MRL 906 on the underlayer 904. In some aspects, the MgO—TIO layer 904 may be MgO-xTIO, where x is in the range of 15 to 45 mol %, inclusive, or x is in the narrower range of 25-35 mol %, inclusive, and in some examples is MgO-30TIO. In some aspects, the substrate 902 may be made of one or more materials such as an Al alloy, NiP-plated Al, glass, glass ceramic, and/or combinations thereof. In some aspects the heatsink layer 903 may include Cr. In some aspects, the MRL 906 may be made of FePt. In some aspects, the MRL 906 may be made instead of an alloy selected from FePtY, where Y is a material selected from Cu, Ni, and combinations thereof. In other aspects, the MRL 906 may be made instead of a CoPt alloy. In some aspects, the MRL 906 may be formed of high anisotropy $L1_0$ FePt with segregants. In some examples, the MRL 906 may include one or more magnetic recording layers, which are not explicitly shown in FIG. 9. Additional layers of the HAMR media may be provided, as discussed above, such as an SUL, a capping layer, and an adhesion layer.

Figure 10:
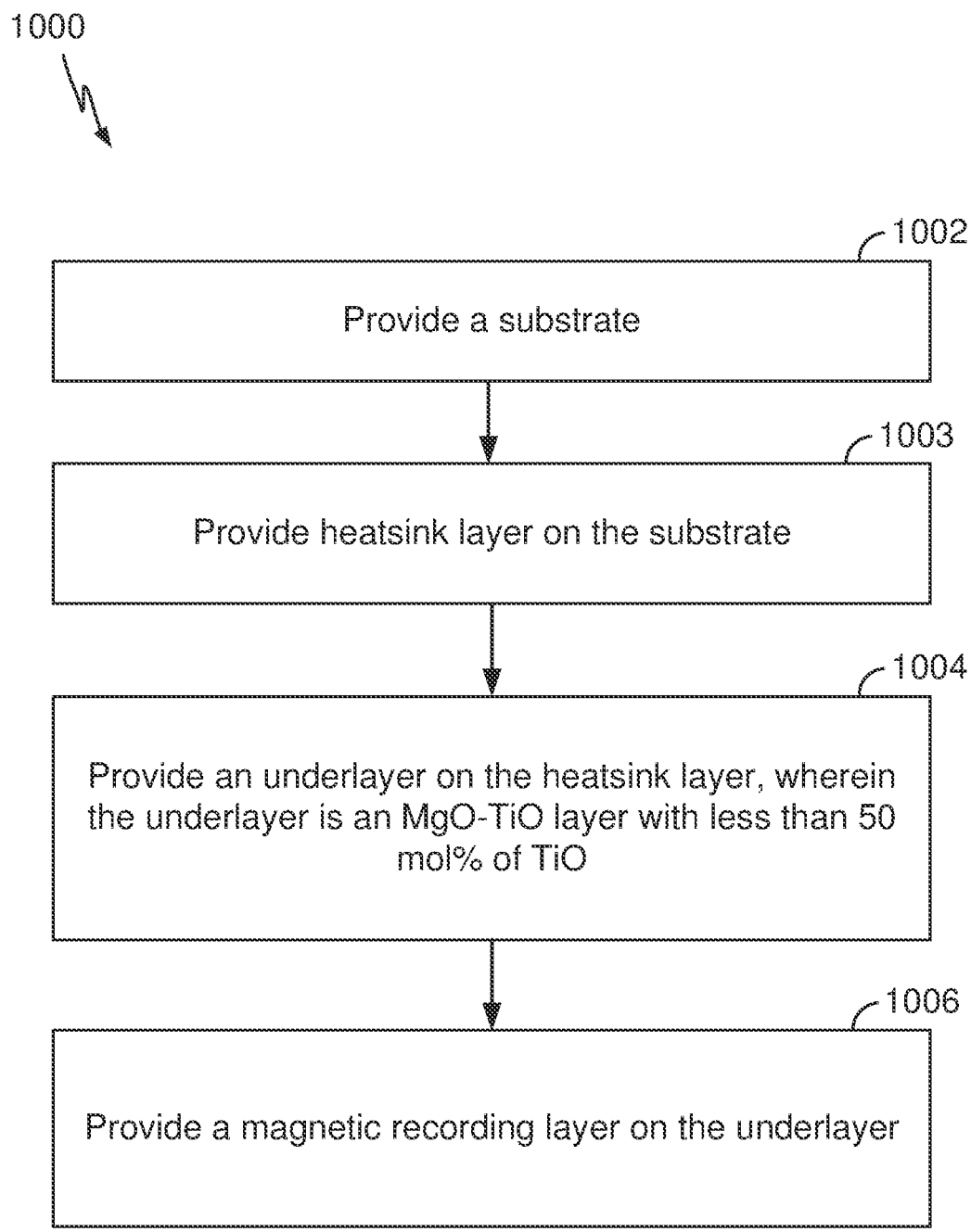
FIG. 10 is a flowchart of an exemplary process for fabricating a magnetic recording medium that includes an MTO underlayer with less than 50 mol % of TiO, in accordance with an aspect of the disclosure.

FIG. 10 is a flowchart of a process 1000 for fabricating a HAMR medium in accordance with some aspects of the disclosure. In one aspect, the process 1000 can be used to fabricate the HAMR media described above in relation to FIG. 9. In block 1002, the process provides a substrate. In block 1003, the process provides a heatsink layer on the substrate. In block 1004, the process provides an underlayer on the heatsink layer, wherein the underlayer is an MgO—TiO layer with less than 50 mol % of TiO (such as the pulsed DC sputtered MgO—TiO layers described above). In some aspects, the MgO—TiO layer 1004 may be MgO-xTIO, where x is in the range of 15 to 45 mol %, inclusive, or x is in the narrower range of 25-35 mol %, inclusive, and in some examples is MgO-30TIO. In block 1006, the process provides an MRL on the underlayer, e.g., by depositing the MRL on the underlayer. In some aspects, the substrate may be made of one or more materials such as an Al alloy, NiP-plated Al, glass, glass ceramic, and/or combinations thereof. In some aspects, the heatsink layer may be made of Cr. In some aspects, the MRL may be made of FePt. In some aspects, the MRL may be made instead of an alloy selected from FePtY, where Y is a material selected from Cu, Ni, and combinations thereof. In other aspects, the MRL may be made instead of a CoPt alloy. In some aspects, the MRL may be formed of high anisotropy $L1_0$ FePt with segregants. In some examples, the MRL may include one or more magnetic recording layers, which are not explicitly shown in FIG. 10. Additional layers of the HAMR media may be provided, as discussed above, such as an SUL, a capping layer, and an adhesion layer.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2e, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
   a substrate;
   a heatsink layer on the substrate, the heatsink layer comprising Cr;
   a thermal resistive layer on the heatsink layer, the thermal resistive layer comprising $RuAlTiO_2$;
   an underlayer on the thermal resistive layer, wherein the underlayer comprises a first MgO—TiO layer with less than 50 mol % of TiO and a second MgO—TiO layer comprising 50 or more mol % of TiO; and
   a magnetic recording layer comprising FePt on the underlayer.

2. The magnetic recording medium of claim 1, wherein the thermal resistive layer is etched to reduce roughness.

3. The magnetic recording medium of claim 1, wherein the first MgO—TiO layer comprises TiO in the range of 15 mol % to 45 mol %, inclusive, and wherein the second MgO—TiO layer comprises TiO in the range of 55 mol % to 85 mol %, inclusive.

4. The magnetic recording medium of claim 1, wherein the first MgO—TiO layer comprises TiO in the range of 25 mol % to 35 mol %, inclusive, and wherein the second MgO—TiO layer comprises TiO in the range of 65 mol % to 75 mol %, inclusive.

5. The magnetic recording medium of claim 1, wherein the first MgO—TiO layer comprises 30 mol % TiO and the second MgO—TiO layer comprises 70 mol % TiO.

6. The magnetic recording medium of claim 1, wherein the underlayer has a thickness in the range of 2.0 nanometers (nm) to 3.5 nm, inclusive.

7. The magnetic recording medium of claim 1, further comprising an adhesion layer, a soft underlayer (SUL), and a seed layer, in that order, between the substrate and the heatsink layer, wherein the adhesion layer comprises NiTa, the seed layer comprises RuAl, and further comprising a capping layer comprising CoFe on the magnetic recording layer and a carbon overcoat (COC) on the capping layer.

8. The magnetic recording medium of claim 1, wherein the underlayer is directly on the thermal resistive layer and the thermal resistive layer is directly on the heatsink layer.

9. A data storage device comprising:
   a slider comprising a magnetic head; and
   the magnetic recording medium of claim 1,
   wherein the slider is configured to write information, using localized heating, to the magnetic recording layer of the magnetic recording medium.

10. A method for manufacturing a magnetic recording medium, the method comprising:
    providing a substrate;
    providing a heatsink layer on the substrate, the heatsink layer comprising Cr;
    providing a thermal resistive layer on the heatsink layer, the thermal resistive layer comprising $RuAlTiO_2$;
    providing an underlayer on the thermal resistive layer, wherein the underlayer comprises a first MgO—TiO layer with less than 50 mol % of TiO and a second MgO—TiO layer comprising 50 or more mol % of TiO; and
    providing a magnetic recording layer comprising FePt on the underlayer.

11. The method of claim 10, wherein the thermal resistive layer is etched to reduce roughness.

12. The method of claim 10, wherein the first MgO—TiO layer comprises TiO in the range of 15 mol % to 45 mol %, inclusive, and wherein the second MgO—TiO layer comprises TiO in the range of 55 mol % to 85 mol %, inclusive.

13. The method of claim 10, wherein the first MgO—TiO layer comprises 30 mol % TiO and the second MgO—TiO layer comprises 70 mol % TiQ.

14. The method of claim 10, wherein the first MgO—TiO layer is sputtered using a pulsed direct current (DC) and wherein the second MgO—TiO layer is sputtered using a non-pulsed direct current (DC).

15. A magnetic recording medium formed using a process comprising:
    providing a substrate;
    providing a heatsink layer on the substrate, the heatsink layer comprising Cr;
    forming a thermal resistive layer on the heatsink layer, the thermal resistive layer comprising $RuAlTiO_2$;
    forming an underlayer on the heatsink layer, wherein the underlayer comprises a first MgO—TiO layer with less than 50 mol % of TiO and a second MgO—TiO layer comprising 50 or more mol % of TiO; and
    providing a magnetic recording layer comprising FePt on the underlayer.

16. The magnetic recording medium formed using the process of claim 15, wherein the first MgO—TiO layer comprises 30 mol % TiO and the second MgO—TiO layer comprises 70 mol % TiO.

17. The magnetic recording medium of claim 1, wherein the first MgO—TiO layer is on the thermal resistive layer and the second MgO—TiO layer is on the first MgO—TiO layer.

18. The magnetic recording medium of claim 1, wherein the second MgO—TiO layer is on the thermal resistive layer and the first MgO—TiO layer is on the second MgO—TiO layer.

19. The magnetic recording medium of claim 1, wherein the first MgO—TiO layer is sputtered using a pulsed direct current (DC) and wherein the second MgO—TiO layer is sputtered using a non-pulsed direct current (DC).

20. The magnetic recording medium formed using the process of claim 15, wherein the first MgO—TiO layer is formed on the thermal resistive layer and the second MgO—TiO layer is formed on the first MgO—TiO layer.

21. The magnetic recording medium formed using the process of claim 15, wherein the second MgO—TiO layer is formed on the thermal resistive layer and the first MgO—TiO layer is formed on the second MgO—TiO layer.

22. The magnetic recording medium formed using the process of claim 15, wherein the first MgO—TiO layer is formed using pulsed direct current (DC) sputtering and wherein the second MgO—TiO layer is formed using a non-pulsed direct current (DC) sputtering.

* * * * *